(12) United States Patent
Mahmood et al.

(10) Patent No.: US 7,741,773 B2
(45) Date of Patent: Jun. 22, 2010

(54) THICK FILM DIELECTRIC STRUCTURE FOR THICK DIELECTRIC ELECTROLUMINESCENT DISPLAYS

(75) Inventors: Kifah Kamil Mahmood, Mississauga (CA); Gangok Lee, Thornhill (CA); Vincent Joseph Alfred Pugliese, Oakville (CA)

(73) Assignee: iFire IP Corporation, Oakville, Ontario, CA (US)

( * ) Notice: Subject to any disclaimer, the term of this patent is extended or adjusted under 35 U.S.C. 154(b) by 1304 days.

(21) Appl. No.: 11/100,190

(22) Filed: Apr. 6, 2005

(65) Prior Publication Data

US 2005/0255708 A1 Nov. 17, 2005

Related U.S. Application Data

(60) Provisional application No. 60/560,602, filed on Apr. 9, 2004.

(51) Int. Cl.
*H05B 33/10* (2006.01)
(52) U.S. Cl. .................. 313/509; 427/419.1; 427/419.5; 427/419.8
(58) Field of Classification Search ................ 313/509; 427/419.1, 419.5, 419.8
See application file for complete search history.

(56) References Cited

U.S. PATENT DOCUMENTS

| | | | |
|---|---|---|---|
| 5,306,756 A | 4/1994 | Felten et al. | |
| 5,432,015 A | 7/1995 | Wu et al. | |
| 5,874,516 A | 2/1999 | Burgoyne, Jr. et al. | |
| 5,891,825 A | 4/1999 | Ushio et al. | |
| 6,042,751 A | 3/2000 | Chan et al. | |
| 6,406,803 B1 | 6/2002 | Abe et al. | |
| 6,613,455 B1 | 9/2003 | Matsumoto et al. | |
| 6,699,797 B1 | 3/2004 | Morris et al. | |
| 6,919,126 B2 | 7/2005 | Wu et al. | |
| 2002/0022565 A1 | 2/2002 | Sreeram et al. | |
| 2002/0076543 A1 | 6/2002 | Sikonia | |
| 2003/0211406 A1 | 11/2003 | Keusseyan | |
| 2003/0219906 A1 | 11/2003 | Giaquinta et al. | |
| 2003/0224205 A1 | 12/2003 | Li et al. | |

FOREIGN PATENT DOCUMENTS

| | | | |
|---|---|---|---|
| JP | 2001180934 A | * | 7/2001 |
| JP | 2003 095657 | | 4/2003 |
| WO | WO 03/056879 A1 | | 7/2003 |

OTHER PUBLICATIONS

Machine translation of JP 2001180934 A is provided for Applicant's convenience.*
International Search Report, PCT/CA2005/000538, Notification of Transmittal of Int'l Search Report Mailed Aug. 22, 2005, Authorized Officer Andrew O'Malley.

* cited by examiner

*Primary Examiner*—Nimeshkumar D Patel
*Assistant Examiner*—Anthony T Perry
(74) *Attorney, Agent, or Firm*—Fay Sharpe LLP (57) ABSTRACT

An improved smoothing layer for use with a thick film dielectric layer, and improved composite thick film dielectric structure is provided. The smoothing layer is a piezoelectric or ferroelectric material that has a reduced amount of defects. The smoothing layer is formed by the addition of surfactant to a sol gel or metal organic solution of organo metallic precursor compounds. The composite thick film dielectric structure comprises a thick film dielectric composition having a PZT smoothing layer thereon, the smoothing layer being made by a process incorporating surfactant. Both the smoothing layer and the composite thick film dielectric structure are for use in electroluminescent displays.

25 Claims, 6 Drawing Sheets

Image of MOD layer with surfactant

FIG. 4

Image of MOD layer without surfactant

THICK FILM DIELECTRIC STRUCTURE FOR THICK DIELECTRIC ELECTROLUMINESCENT DISPLAYS

This application claims the benefit of U.S. Provisional Application Ser. No. 60/560,602, filed Apr. 9, 2004.

FIELD OF THE INVENTION

The invention relates generally to thick film dielectric electroluminescent displays. More specifically, the invention is an improved novel composite thick film dielectric structure, a method of making thereof and electroluminescent displays incorporating such structures.

BACKGROUND OF THE INVENTION

Thick film dielectric electroluminescent displays are typically fabricated on ceramic, glass ceramic, glass or other heat resistant substrate and provide superior resistance to dielectric breakdown, as well as a reduced operating voltage compared to thin film electroluminescent (TFEL) displays fabricated on glass substrates. The fabrication process for the display entails first depositing a set of row electrodes on the substrate. Next a thick film dielectric layer is deposited, following this, a thin film structure is deposited that comprises one or more thin film dielectric layers sandwiching one or more thin phosphor films and a set of optically transparent column electrodes. The entire structure is covered with a sealing layer that protects the thick and thin film structures from degradation due to moisture or other atmospheric contaminants.

The composite thick film dielectric layers used in such displays have a high dielectric constant, allowing the use of relatively thick dielectric layers in the displays without a significant increase in the display operating voltage. Because the dielectric breakdown strength of these materials is relatively low, relatively thick dielectric layers are used, typically greater than about 10 micrometers, to prevent dielectric breakdown during display operation. Typically, the thick film layer comprises a sintered perovskite piezoelectric or ferroelectric material such as lead magnesium niobate (PMN) or lead magnesium titanate-zirconate (PMN-PT) with a dielectric constant of several thousand. There may also be a thinner overlayer of a compatible piezoelectric or ferroelectric material such as lead zirconate titanate (PZT) applied using metal organic deposition (MOD) or sol gel techniques to smooth the thick film surface for deposition of a thin film phosphor structure.

The Applicant's U.S. Pat. No. 5,432,015 (the disclosure of which is incorporated herein by reference in its entirety) discloses thick film dielectric composite structures for use in electroluminescent displays. The thick film layer is sintered at high temperatures onto a suitable substrate onto which thin film gold electrodes have been applied to achieve a sintered thick film density that is sufficiently high that the remaining porosity, particularly in the upper portion of the layer can be filled by an overlayer deposited using sol gel or MOD techniques. However, the overlayer does not completely fill the porosity of the sintered material since it undergoes a severe volume reduction when the sol gel or MOD precursor materials are fired to form the piezoelectric or ferroelectric material.

The Applicant's PCT patent application Serial No. WO00/70917 (the disclosure of which is incorporated herein by reference in its entirety, discloses an isostatic pressing process by which a deposited thick film dielectric material is mechanically compressed using an isostatic pressing process prior to sintering. This serves the function of increasing the density and decreasing the porosity of the thick film material so that when the overlayer is applied, both the dielectric constant and the dielectric strength of the layer are increased. Dielectric breakdown is associated with random defects in the dielectric layers and the probability of breakdown increases with increasing display area. Thus layers with a higher nominal dielectric strength are desired for use for larger area displays to counteract this tendency.

The Applicant's International Patent Application PCT CA02/01932 (the disclosure of which is incorporated herein by reference in its entirety) discloses a modified thick film paste formulation used to make a thick film dielectric layer. This modified thick film dielectric layer may be sintered at temperatures as low as 650° C. to facilitate the use of a glass substrate. However, the modified thick film dielectric layer still contains residual porosity.

It is therefore desired to provide an improved composite thick film dielectric structure that exhibits fewer defects (i.e. pores or holes) which potentially act as sites for dielectric breakdown and provide a conduit for undesirable reactions between the thick film dielectric layer and phosphor layers leading to reduced display life.

SUMMARY OF THE INVENTION

The invention is an improved smoothing layer that is applied onto a thick film dielectric layer forming a composite. The improved smoothing layer results in substantially reduced density of surface defects in the base thick film dielectric layer. The improvement is achieved by incorporating a surfactant within the smoothing layer. The addition of surfactant to the deposition solution forming the smoothing layer facilitates wetting of the underlying thick film dielectric layer and thus a reduction in the pores/holes (herein referred to as defects) present in the thick film dielectric layer.

The invention also encompasses improved composite thick film dielectric structures and electroluminescent displays incorporating such structures.

According to an aspect of the present invention is a smoothing layer for use with a thick film dielectric layer, the smoothing layer being made by the addition of a surfactant to a metal organic solution or sol gel that is subsequently applied to the thick film dielectric layer. In aspects, this applied smoothing layer is then sintered (i.e. fired) at suitable temperatures forming a piezoelectric or ferroelectric material. In further aspects, the piezoelectric or ferroelectric material is lead zirconate titanate (PZT).

According to another aspect of the present invention is a lead zirconate titanate (PZT) smoothing layer comprising surfactant.

According to another aspect of the present invention is a composite thick film dielectric structure for an electroluminescent display, said structure comprising;

a thick film dielectric layer having a PZT smoothing layer thereon, said smoothing layer having an areal density of pit defects of about less than 100 defects per square millimeter. In aspects, the PZT smoothing layer is made by the addition of a surfactant to a metal organic solution or sol gel comprising lead acetate, titanium alkoxide, zirconium alkoxide and solvent that is subsequently applied to the thick film dielectric layer and then sintered at temperatures of up to about 850° C. In further aspects, additional PZT smoothing layers are provided, wherein such additional layers are applied as metal organic solutions that do not comprise surfactant.

According to yet another aspect of the present invention is a sintered composite thick film dielectric structure for an electroluminescent display, said structure comprising:
  a lower thick film dielectric layer; and
  an upper smoothing layer, wherein said smoothing layer reduces defects in said lower thick film dielectric layer, said smoothing layer being made by the addition of a surfactant to a metal organic solution or sol gel that is subsequently applied to the thick film dielectric layer and sintered.

According to still another aspect of the present invention is a sintered composite thick film dielectric structure for an electroluminescent display, said structure comprising:
  (a) a lower layer of a thick film dielectric composition comprising one or more of lead magnesium niobate (PMN), lead magnesium niobate-titanate (PMN-PT), lead titanate, barium titanate and lead oxide; a glass frit composition comprising lead oxide, boron oxide and silicon dioxide; and
  (b) an upper smoothing layer comprising at least one layer of lead zirconate titanate (PZT), wherein said at least one layer directly adjacent to (a) has an areal density of pit defects of about less than 100 defects per square millimeter.

According to still another aspect of the present invention is a method of making a composite thick film dielectric structure for an electroluminescent display, the method comprising:
  overlaying a thick film dielectric layer with a smoothing layer applied as a metal organic solution or sol gel that comprises surfactant; and
  sintering at temperatures of up to about 850° C.

In aspects, additional smoothing layers that do not comprise surfactant may be overlaid onto the composite thick film dielectric structure and sintered. In other aspects, the overlaying of the smoothing layer is done by metal organic deposition (MOD) or sol gel techniques.

According to yet another aspect of the present invention is an electroluminescent display, said display comprising;
  a substrate;
  a composite thick film dielectric structure provided on said substrate; and
  a phosphor composition provided on said composite thick film dielectric structure. In aspects, the composite thick film dielectric structure comprises a smoothing layer having an areal density of pit defects of about less than 100 defects per square millimeter. The electroluminescent display additionally comprises thin dielectric layers.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the detailed description given herein and from the accompanying drawings, which are given by way of illustration only and do not limit the intended scope of the invention.

DETAILED DESCRIPTION OF THE INVENTION

The present invention is an improved composite thick film dielectric structure for use in electroluminescent displays. The improved composite thick film dielectric structure comprises a bottom thick film dielectric layer onto which a novel smoothing layer is overlaid. The novel smoothing layer having less pit defects than smoothing layers previously contemplated.

Thick film dielectric layers are typically screen printed, fired and overlaid with a smoothing layer to make it suitable for phosphor deposition. The smoothing layer previously used prepared most of the surface of the thick film, however, did not adequately fill unusually large pores or holes (i.e. defects) in the thick film dielectric layer leaving a certain number of holes in the smoothed layer. The areal density of these holes can be reduced by improving the thick film dielectric layer so that there are a smaller number of unusually large pores, but this is difficult and involves time consuming and expensive grinding of the particulates in the thick film paste used to make the thick film layer, extensive homogenization of the thick film paste prepared from the particulates, and/or isostatic pressing of the thick film layer at extremely high pressures requiring very large and expensive equipment prior to sintering of the thick film dielectric layer.

The present invention overcomes these problems by incorporating a suitable surfactant into the metal organic solution or sol gel that forms the smoothing layer used to overlay the thick film dielectric layer. This is a low cost and improved method for achieving the result of reducing the areal density of pores or holes. The surfactant substantially improves the penetration and interaction of the smoothing layer overlaid as a MOD solution or sol gel onto the thick film dielectric layer to effectively eliminate the majority of the pores/holes. The surfactant not only modifies the surface tension between the applied film and the substrate upon which it is applied, but it must also be compatible with the high temperature chemistry that occurs when the smoothing layer is sintered (i.e. fired) at high temperature to without impairing the high dielectric constant of the smoothing layer or reducing the high dielectric strength that the smoothing layer imparts to the overall thick dielectric layer.

Surfactants are also known for their use in cured polymer layers (U.S. Pat. Nos. 5,306,756, 5,874,516, 5,891,825, 6,406,803 and 6,613,455). Surfactants have also been contemplated for use with certain low dielectric constant ceramics (U.S. 2003/0219906) or within thick film pastes for facilitating their deposition in high resolution patterns for defining electrical circuits (U.S. 2003/02111406), however, they have never been contemplated for use within a smoothing layer for a high dielectric thick film composition nor have been contemplated for use to correct defects within smoothing layers used in conjunction with high dielectric thick film compositions.

The improved smoothing layer of the invention can be provided as sol solution and applied onto a thick film dielectric layer using a MOD process that significantly reduces the density of defects on the surface of the resulting composite thick film dielectric layer. Alternatively, the sol solution can be applied using sol gel techniques known to those of skill in the art. The sol gel or MOD layer is formulated to provide a high dielectric constant material that in aspects is a compatible piezoelectric or ferroelectric material such as a lead zirconate titanate (PZT) smoothing layer as described in the Applicant's WO 00/70917 and PCT CA02/01932 (the disclosures of which are incorporated herein by reference in their entirety). Briefly, if a PZT smoothing layer is desired, the MOD solution comprises lead acetate, titanium alkoxide and zirconium alkoxide in a suitable solvent. The surfactant is added to this mixture. The behaviour of the MOD solution used to deposit the smoothing layer is significantly different for glass substrates than it is for the alumina substrates described in the prior art. These differences are in part due to the different thick film firing temperatures used for the different substrate materials. The optimum MOD solution viscosity is different for different substrate materials.

The smoothing layer formed from a MOD solution layer may comprise materials other than PZT. The requirements for the smoothing layer materials are that they be chemically and physically compatible with the thick film dielectric layer so that the combined layer has the required smoothness, dielectric strength and dielectric constant. Examples of other suitable smoothing layer materials may be selected from lead lanthanum zirconate titanate, barium titanate, barium strontium titanate, barium tantalate and tantalum oxide.

The surfactant for use in the smoothing layer may be selected from any surfactant that is compatible with the high temperature chemistry that occurs when the MOD solution is fired at high temperature to form the smoothing layer without substantively impairing the high dielectric constant of the smoothing layer itself or reducing the high dielectric strength that the smoothing layer imparts to the overall thick dielectric structure. The surfactant is in aspects non-ionic and should be fully miscible with the MOD solvent, which is in aspects is ethylene glycol. The surfactant should fully decompose so as not to leave a solid residue within the smoothing layer when it is fired at about 500° C. Suitable non-ionic surfactants for use in the present invention include but are not limited to Surfynol™ 61, dimethyl hexynol, Surfynol™ 420, ethoxylated acetylenic diols, Triton™ X-100, p-tertiary octylphenoxy polyethyl alcohol and mixtures thereof. Anionic surfactants are also suitable for use and provide some reduction in defect density, however are not as desired as the non-ionic surfactants. Suitable anionic surfactants include but are not limited to Emphos™ PS-200, alkyl ether phosphate, cetyltrimethylammonium bromide and mixtures thereof. In aspects of the invention, Surfynol™ 61 is used. The amount of surfactant for use in the MOD solution for the smoothing layer is in the range of 0.1% to 5% by weight, preferably in the range 1.0% to 2.0% by weight. It is understood by one of skill in the art that the range of surfactant may be any subrange between 0.1% to 5% by weight.

The composition of the thick film paste used to form the thick film dielectric layer comprises one or more perovskite-forming precursor powders selected from lead magnesium niobate (PMN), lead magnesium niobate-titanate (PMN-PT), lead titanate, and barium titanate and optionally lead oxide to compensate for lead oxide evaporated from the powder during subsequent sintering or heat treatment steps. It also comprises a glass frit composition that comprises lead oxide, boron oxide and silicon oxide and has a melting temperature below about 550° C.; and a vehicle comprising a solvent, a polymer binder to hold the deposited film together prior to sintering and optionally viscosity and surface tension modifying agents to allow deposition of a film of the required thickness and thickness uniformity using the selected deposition method. Deposition methods include but are not limited to screen-printing, stenciling and roll coating. The optimum viscosity for deposition is dependent on the selected deposition method.

In non-limiting embodiments of the invention, the perovskite-forming precursor powders may be included in the thick film dielectric composition in different proportions. The major phase is preferably PMN or PMT-PT and is present at between about 85 and 95% of the total thick film dielectric composition weight. The remaining perovskite-forming precursor powders may be present in the following weight percentages: barium titanate, up to about 10%; lead oxide, up to about 8%; and lead titanate, up to about 15%. The glass frit composition may be present as a pre-homogenized or mixed powder comprising lead oxide, boron oxide ($B_2O_5$), and silicon oxide ($SiO_2$) in approximately the following weight percentages: lead oxide, about 87 to 94%; boron oxide, about 6% to 9%; and silicon dioxide, up to about 6%. The lead oxide, boron oxide and silicon dioxide powders form a solid solution above about 550° C. The total weight of the glass frit composition may be from about 1% to 8% of the weight of PMN or PMT-PT.

The grain size of the perovskite-forming precursor powders and the glass frit composition powders may be about one micron or less and larger than about 0.2 microns on average with the exception that the grain size of approximately 20 to 30% of the barium titanate powder should be about 50 to 100 nanometers and in aspects, about up to 50 nanometers to ensure that it is adequately dispersed within the sintered thick film dielectric layer.

The vehicle is formulated to provide appropriate deposition properties, and does not have a significant effect on the properties of the sintered thick film dielectric layer provided that the constituent elements are burned or volatilized off as the deposited films are heated prior to sintering. However, the properties of the vehicle are important in achieving the deposition of defect free layers, as is the milling time of the paste to reduce the size of the particulates in the paste. The viscosity, as well as the solid-to-liquid ratio of the paste, are important parameters in determining an optimum paste for defect free printing or deposition. The optimum viscosity and solid-to-liquid fraction are different for deposition on glass material substrates than they are for deposition on ceramic substrates, possibly because of differences in their micro-roughness.

In an embodiment of the invention, the improved composite thick film dielectric structure of the invention is fabricated by first depositing and sintering a PMN or PMN-PT based paste to form a thick film and then applying the smoothing PZT layer comprising surfactant deposited using a metal organic deposition (MOD) process. The composition of this structure near its juncture with the substrate is predominantly derived from the initially deposited PMN or PMN-PT and the composition near its upper surface is predominantly PZT. In the intervening zone these two materials intermingle and react to form a composite structure. The dielectric breakdown strength of the dielectric layer is related to the detailed chemical and physical structure of the layer. Dielectric breakdown typically initiates at defects or anomalies in the film. The probability of a dielectric breakdown event is dependent on the number of defects present, and therefore on the area of the display of which it is a part. It may be affected by the nature of layers immediately adjacent to the dielectric layer, the distribution of stress within the layer and the environment, particularly the moisture level to which a display containing the dielectric layer is subjected. An aspect of the instant invention is to reduce the density of defects in the dielectric layer by the using of the smoothing layer having surfactant incorporated therein.

In formulating the thick film component of the dielectric layer there are a number of trade-offs to consider. As the sintering temperature is lowered, the porosity of the sintered layer increases since the sintering process is further from completion. The present invention enables achievement of a composite thick film dielectric structure without or with minimal mechanical defects such as pores, holes, cracks and voids that also has acceptably low pyrochlore content to respectively achieve adequate dielectric breakdown strength and a high dielectric constant. This is achieved by a judicious choice of chemical composition and physical properties of the thick film pastes used to form the thick film portion of the composite dielectric layer and the chemical composition and physical properties of the surfactant MOD solution for the smoothing layer.

The mechanical integrity of electroluminescent devices constructed using the present invention are dependent on the physical properties of the substrate, particularly the thermal expansion coefficient of the substrate. The thermal expansion coefficient should be in the range of about $4 \times 10^{-6}$ and $10 \times 10^{-6}/°$ C., and in aspects in the range of about $5.5 \times 10^{-6}$ and $9 \times 10^{-6}/°$ C. If the thermal expansion coefficient of the substrate material is too low with respect to that of the composite thick film dielectric layer, it may crack.

The composite the thick film dielectric structure is incorporated into electroluminescent displays and is provided within such displays on glass or glass/ceramic or ceramic substrates that may comprise lead magnesium niobate, lead titanate, and/or barium titanate. The invention is particularly applicable to composite thick film dielectric structures comprising lead magnesium niobate coated and heat treated using a MOD solution with surfactant to form a smoothing overlayer comprising lead zirconium titanate.

In a representative embodiment of the invention, a composite thick film dielectric structure for an electroluminescent display comprises a thick film dielectric layer formed by printing, compressing and sintering a paste containing a high dielectric constant dielectric powder and overlaying it with at least one smoothing layer of high dielectric constant material formed by a process of depositing and firing a metal organic solution (MOD) as exemplified in PCT Patent Application serial number WO00/70917 (the disclosure of which is incorporated herein by reference in its entirety) wherein the MOD solution comprises organo-metallic precursor compounds required to form the smoothing layer dissolved in a suitable solvent and a surfactant to reduce the interfacial surface tension between the MOD solution and the sintered thick film dielectric layer to facilitate substantial inter-penetration of the MOD solution and the thick film dielectric composition as the overlaid MOD layer is heated and fired to form a substantially pore-free composite layer with a smooth surface.

In another embodiment of the invention, a composite thick film dielectric structure for an electroluminescent display is constructed on a rigid substrate where the upper surface of which has a smoothing layer with an areal density of pit defects of less than about 100 defects per square millimeter. A pit defect is defined as a hole or depression in the surface the depth of which exceeds 0.5 micrometers.

In still other embodiments of the invention, a composite thick film dielectric structure for an electroluminescent display comprises a magnesium lead niobate thick film layer formed by printing, compressing and sintering a paste containing a high dielectric constant dielectric powder and overlaying it with at least one smoothing layer of high dielectric constant material formed by a process of depositing and firing a MOD solution wherein the solution comprises organo-metallic precursor compounds required to form a smoothing layer comprising lead zirconate-titanate and a surfactant to reduce the interfacial surface tension between the MOD solution and the sintered thick film layer to facilitate substantial interpenetration of the MOD material and the thick film material as the MOD layer is heated and fired.

In still further embodiments of the invention, a composite thick film dielectric structure for an electroluminescent display comprises a magnesium lead niobate thick film layer formed by printing, compressing and sintering a paste containing a high dielectric constant dielectric powder and overlaying it with at least one smoothing layer of lead zirconate-titanate formed by a process of depositing and firing a MOD solution wherein the solution comprises organo-metallic precursor compounds required to form the smoothing layer and a surfactant comprising that lowers the interfacial surface tension between the MOD solution and the thick film dielectric layer.

In still other embodiments, a composite thick film dielectric structure for an electroluminescent display comprises a magnesium lead niobate thick film layer formed by printing, compressing and sintering a paste containing a high dielectric constant dielectric powder and overlaying it with a smoothing layer of lead zirconate titanate having the formula $PbZr_x Ti_{1-x}O_3$ where $0.5 \leq x \leq 0.55$ formed by a process of depositing and firing a MOD solution comprising lead acetate trihydrate, methoxyethanol, zirconium propoxide, titanium propoxide, ethylene glycol and a surfactant comprising Surfynol 61™.

One or more smoothing layers may be overlaid onto the thick film dielectric layer that is deposited onto the substrate. In aspects, the smoothing layer directly adjacent the thick film dielectric layer comprises surfactant. Subsequently added smoothing layers do not require surfactant. The total thickness of the smoothing layer(s) applied to the thick film dielectric composition is up to about 1500 nm (and any ranges therein as is understood by one of skill in the art) after sintering. The smoothing layers are applied to achieve the desired surface smoothness defined as a surface relief in the absence of discrete pit defects of less than 0.5 micrometers over a lateral distance along the surface of the combined composite dielectric layer of the order of the display pixel size. The number and thickness of the layers required to achieve the required smoothness is dependent on the thickness, porosity and surface roughness of the underlying thick film layer as is understood by one of skill in the art. The improved smoothing layer and the improved composite thick film dielectric structure of the invention is for use within electroluminescent displays such as those described for example in Applicant's U.S. Pat. No. 5,432,015 (the disclosure of which is incorporated herein in its entirety).

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

Figure 1:
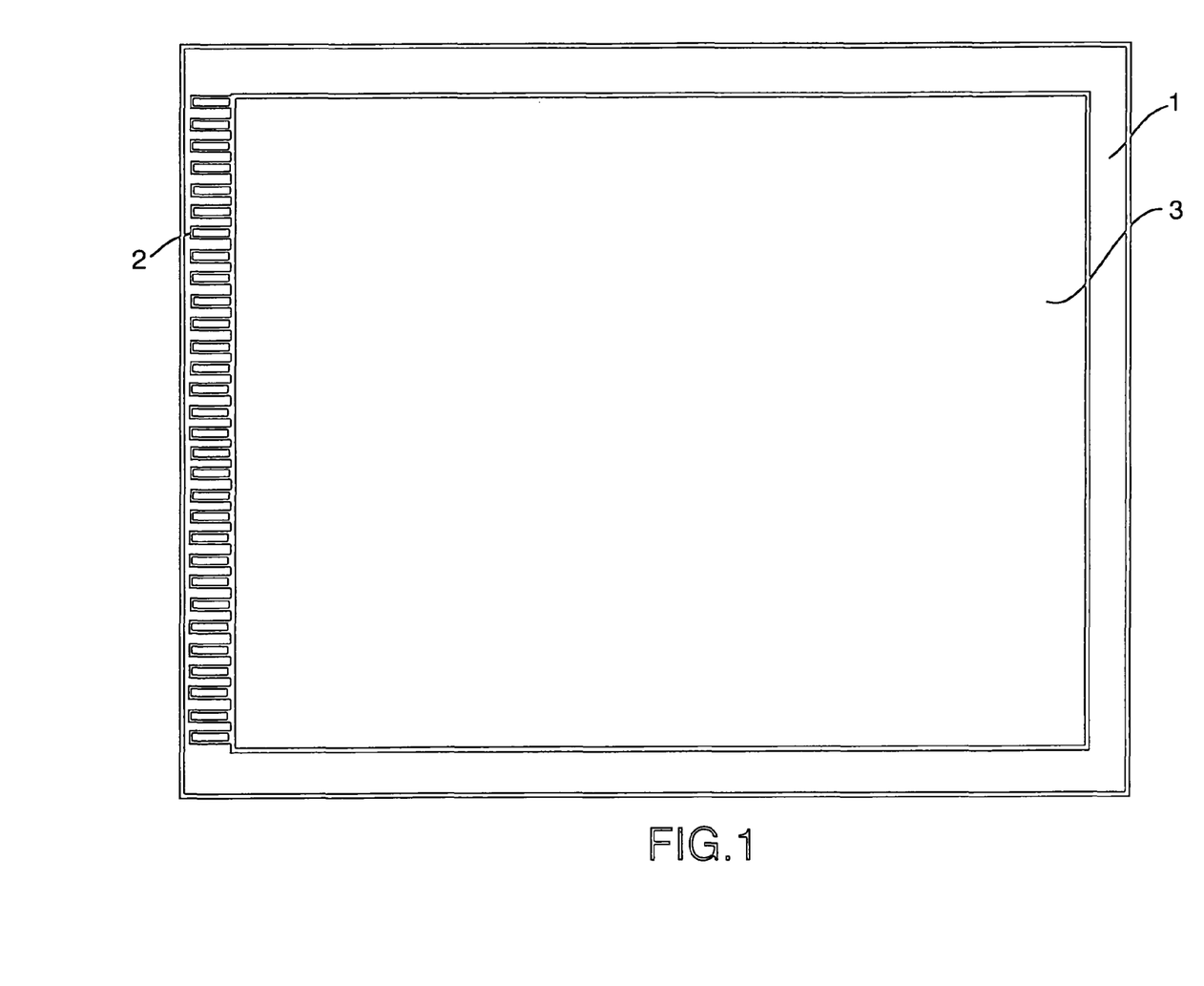
FIG. 1 shows a schematic plan view of an electroluminescent test pixel.
Figure 2:
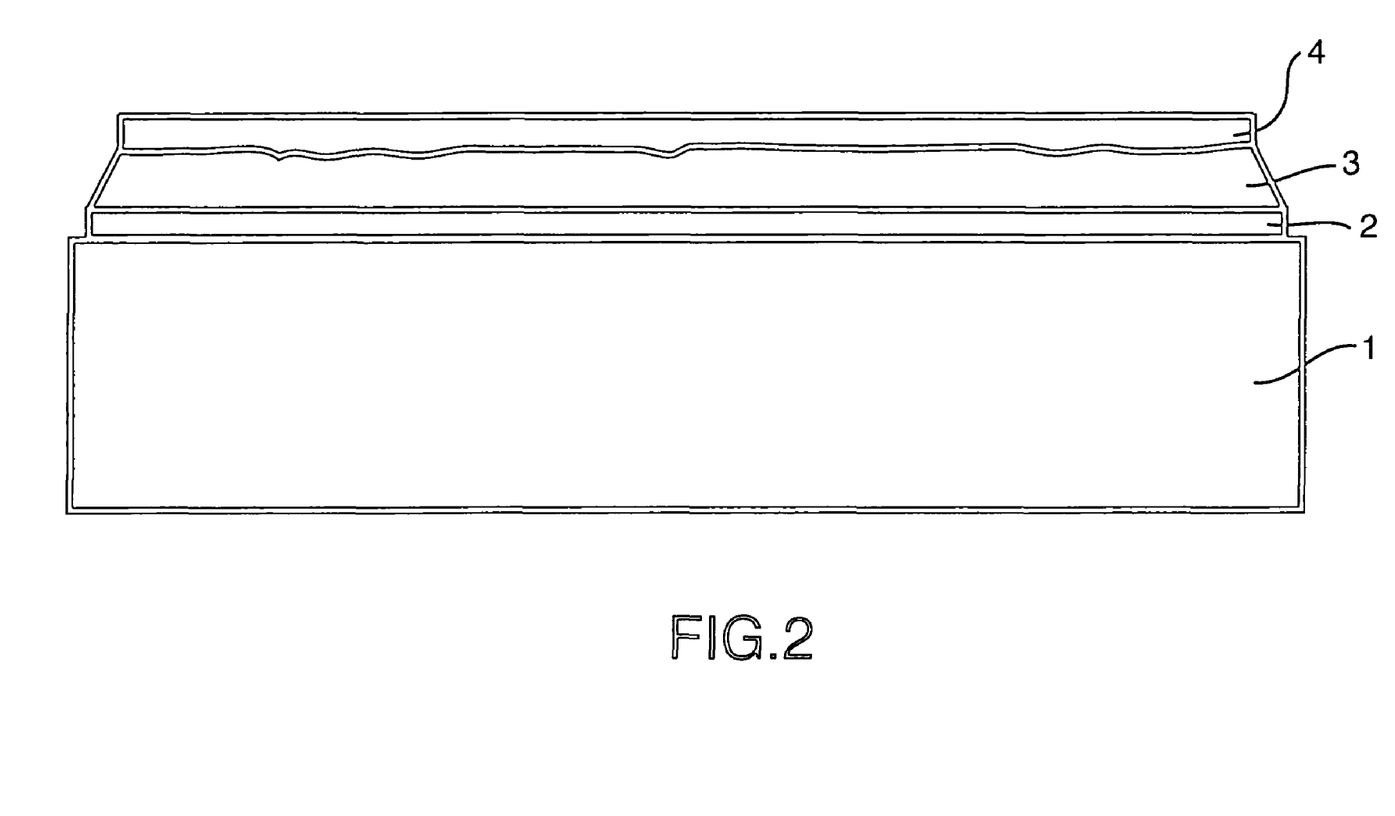
FIG. 2 shows a section of a thick film electroluminescent element showing the position of the thick film dielectric layer and smoothing layer of this invention.

With reference to the schematic diagrams of FIG. 1 and FIG. 2, a set of gold row electrodes 2 and a thick film dielectric layer 3 for a 43 centimeter diagonal electroluminescent display were constructed on a PP8C glass substrate 1 obtained from Nippon Electric Glass Co. Ltd. of Osaka Japan. The methods for deposition of the row electrodes and the thick dielectric layer were similar to the methods described in U.S. patent application Ser. No. 09/326,777 in combination with the methods described herein. The gold electrode layer was deposited onto the substrate prior to deposition of a thick film dielectric layer. The thick film dielectric layer was formed of two sequentially formed layers with the process for depositing each layer consisting of printing a thick film paste, drying the printed layer, densifying the printed layer using isostatic pressing and finally sintering the densified layer. The densification process was carried out using cold isostatic pressing as taught in U.S. patent application Ser. No. 09/540,288 (the disclosure of which is incorporated herein by reference in its entirety). The sintering was carried out under air in a belt furnace at a peak temperature of 700° C. The total transit time through the belt furnace was 75 minutes. The thick film paste was formulated with perovskite-forming powdered precursor materials including 600 grams of PMN obtained from Ferro Corporation of Niagara Falls, N.Y. USA, 18 grams of lead oxide, 20 grams of lead titanate and 20 grams of barium titanate, all with a typical particle diameter of about one micrometer and an additional 6 grams of barium titanate obtained from TPL of Albuquerque, N. Mex., USA with a particle diameter of about 50 nanometers. The precursor materials were blended into a slurry consisting of a solution of 293 grams of alpha-terpineol, 5 grams of acetone, 4 grams of Emphos PS-220 obtained from Witco of Houston, Tex. and 4 grams of di-n-butyl phthalate into which 15 grams of CF 7589 glass frit obtained from Ferro Electronic Materials of 4511 Hyde Park Blvd. Niagara Falls, N.Y. USA was added and milled for about two hours until the frit particle size was reduced to about one micrometer. Upon addition of the precursor materials, the resulting slurry was further milled for an additional two hours and then passed through a 10 micrometer filter to remove large particles. The milling was carried out using a zirconia 3 mm ball mill to minimize contamination. To the filtered slurry was added vehicle consisting of 1 to 3% ethyl cellulose in α-terpineol to adjust the viscosity to between 30 and 5000 centipoise. The average size of the particles (D50) as measured by a Microtrac particle size analyzer in the milled slurry was 0.63 micrometers.

Following deposition of the thick film layers a smoothing layer 4 as shown in FIG. 2 was deposited using a MOD solution prepared as follows. 850 grams of methoxyethanol was added to 562 grams of lead acetate trihydrate and the mixture was stirred on a hot plate until the lead acetate was dissolved. The solution was distilled to remove 200 milliliters of liquid and cooled to 90° C. Then 322 grams of zirconium propoxide was added and stirred to aid dissolution, and 167 grams of titanium propoxide was solution was added. The resulting solution was distilled to remove 540 milliliters of liquid from the solution. Following this, 256 grams of anhydrous ethylene glycol and 23 grams of Surfynol 61 surfactant were added to the solution through a funnel. The resulting solution was cooled to ambient temperature and filtered. The viscosity of the solution was measured using a falling ball viscometer to be 25 centipoise, the optical absorbance of the solution was measured to be in the range of 0.05 to 0.2% at 400 nanometers using an Ultrospec 1000 UV/Visible Spectrophotometer and the water content was measured to be in the range of 0.5 to 1.2% using Karl Fisher analysis. The MOD solution was stored under argon until it was spun onto the thick film dielectric layer described earlier using a spin rate of 350 rpm. The coated substrate was then fired in a belt furnace under air at a peak temperature of 700° C. for 75 minutes. Following firing, a second MOD solution was prepared using a MOD solution similar to that used for the first layer, but without the surfactant added. The viscosity of this solution was adjusted to 9 cps and was spin coated onto the first MOD layer under the same conditions as the first MOD layer to form the completed composite thick dielectric structure. The combined thickness of the two MOD derived layers was about 1500 nanometers.

Figure 3:
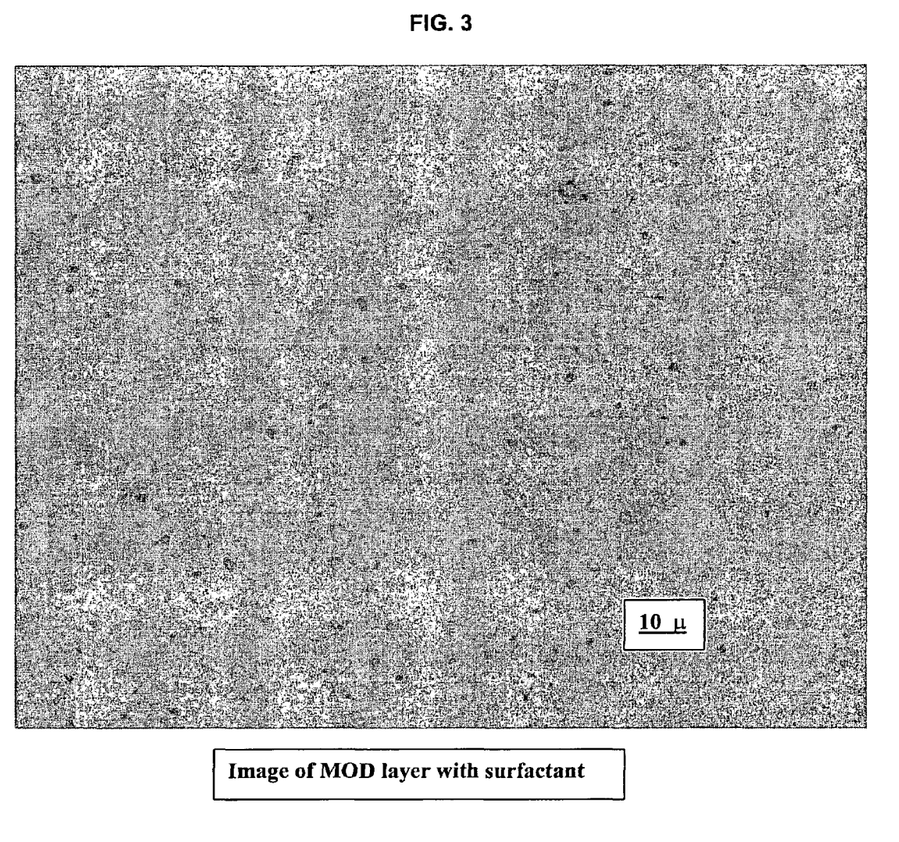
FIG. 3 shows a micrograph of the surface of a smoothing layer on a thick dielectric layer formed using the methods of the invention.

The surface of the completed composition dielectric layer was examined under a microscope. A photomicrograph of the surface is shown in FIG. 3. Only a small number of defects in the form of pits or indentations in the surface are evident in the photomicrograph. The areal density of pit defects is about 50 defects per square millimeter. Further analysis of a much smaller portion of the same area of the surface using scanning electron microscopy revealed that only about 10% of these defects represent pits penetrating through the MOD derived smoothing layer into the underlying thick film layer and the remaining 90% represent depressions in the smoothing layer with a depth typically less than 0.5 micrometers.

Example 2

A composite thick dielectric structure was constructed on a substrate similar to that described in example 1, except that a MOD solution without surfactant added and with a viscosity of 15 to 40 centipoise was used in place of the MOD solution for the first MOD layer as described in Example 1.

Figure 4:
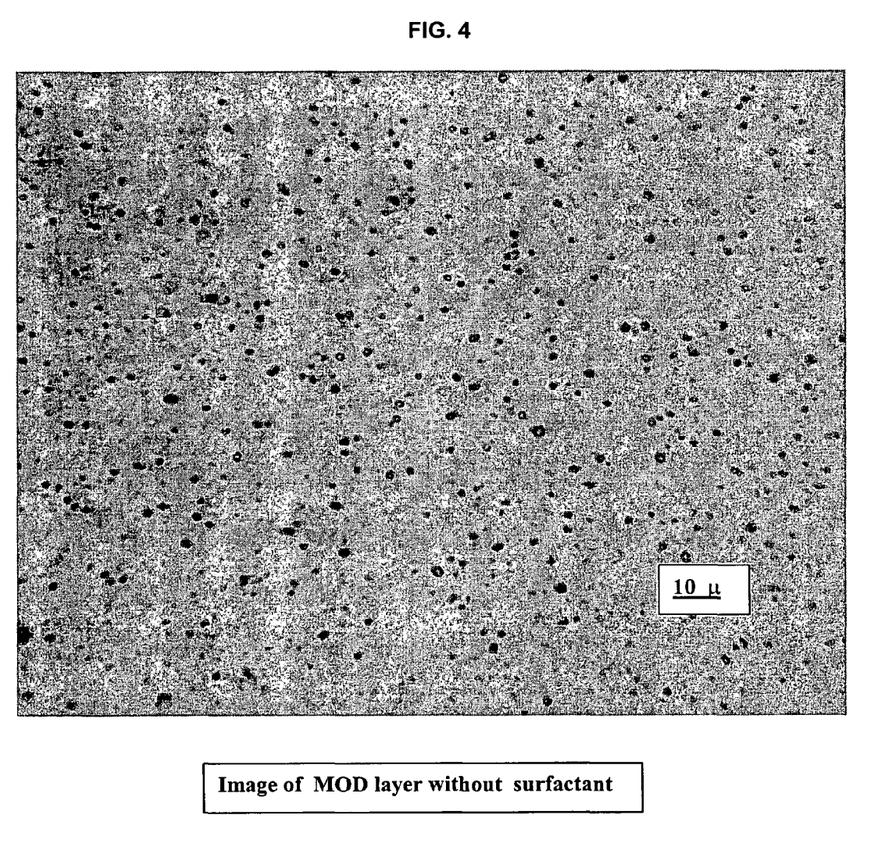
FIG. 4 shows a micrograph of the surface of a smoothing layer on a thick dielectric layer formed using the methods of the prior art.
Figure 5:
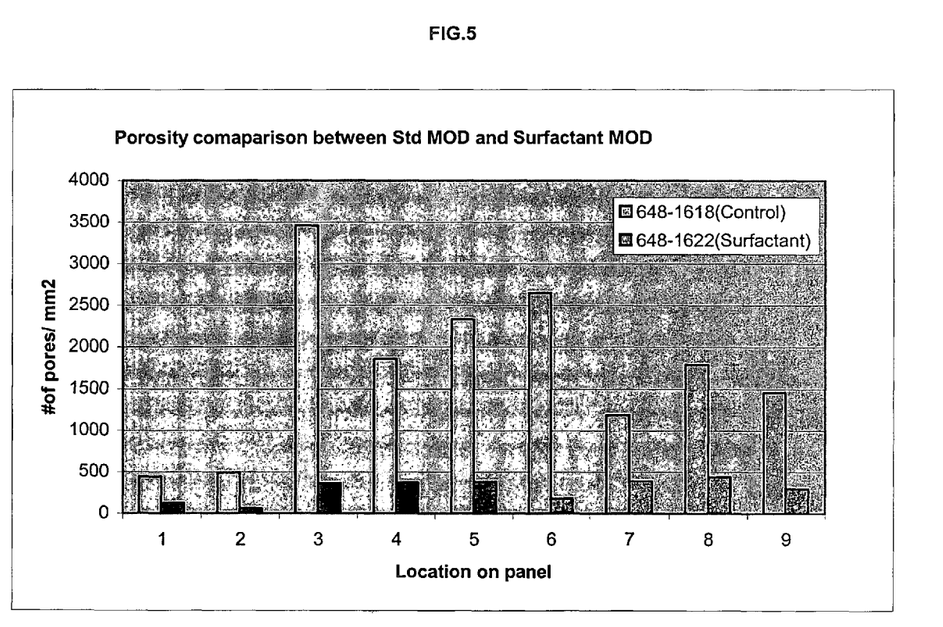
FIG. 5 shows the areal density of surface defects in a thick dielectric layer made according to the methods of the prior art and according to the method of the invention.
Figure 6:
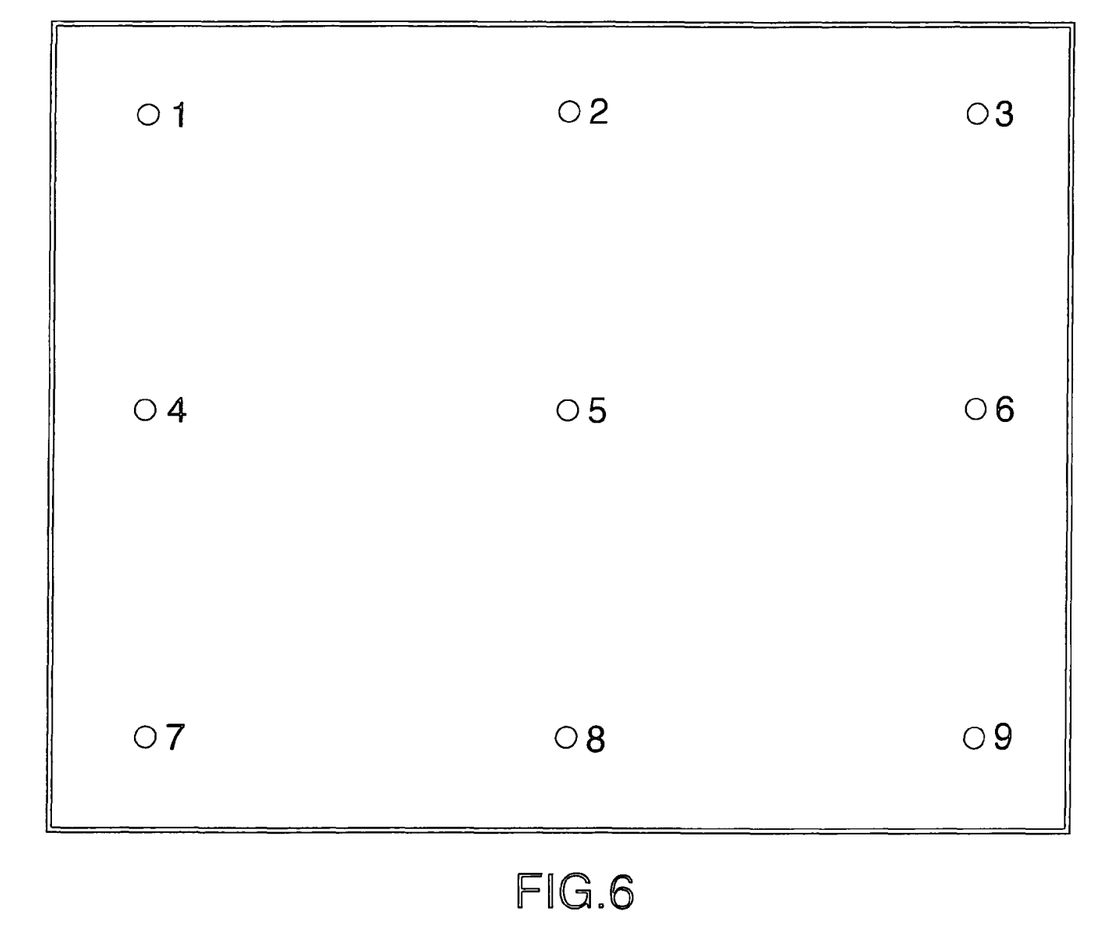
FIG. 6 is a top view of a 43 centimeter diagonal panel showing the sample areas of FIG. 5.

The surface of the completed composition dielectric layer was examined under a microscope. A photomicrograph of the surface is shown in FIG. 4. The areal density of defects is about 3500 defects per square centimeter. Compared to the surface shown in FIG. 3, the surface of the MOD layer shows a large number of defects (pits and indentations) evident in the photomicrograph, showing the utility of the surfactant containing MOD solution described in example 1 in dramatically reducing the number of surface defects. FIG. 5 shows a histogram with the number of defects for several 0.15 square millimeter sections of a thick dielectric layer made according to the method of the prior art without the use of a surfactant in the MOD solution used to form the smoothing layer as compared to the number of defects for several sections of a similar thick dielectric layer with the same area made according to the method of the invention. The sections were selected from comparable areas of thick film deposited on the 43 centimeter diagonal substrates of examples 1 and 2. The approximate location of the selected areas for the panels made with and without surfactant added to the MOD solution are shown in FIG. 6. The numbered locations in FIG. 6 correspond to the locations identified on the horizontal axis of FIG. 5. As can be seen from the data, the defects density was reduced by about a factor of about 5 using the methods of the invention. Further the variability in the defect density at different locations on the substrate was substantially reduced, indicating the invention improves the uniformity of the surface quality over that achievable with the methods of the prior art.

Although preferred embodiments of the invention have been described herein in detail, it will be understood by those skilled in the art that variations may be made thereto without departing from the spirit of the invention or the scope of the appended claims.

The invention claimed is:

1. A smoothing layer for use with a thick film dielectric layer, the smoothing layer comprising a high dielectric constant material with an areal density of pit defects of about less than 100 defects per square millimeter, made by the addition of a surfactant to a metal organic solution or a sol gel of organo metallic precursor compounds that is subsequently sintered on said thick film dielectric layer, wherein said surfactant is selected from the group consisting of a non-ionic surfactant selected from the group consisting of dimethyl hexynol, ethoxylated acetylenic diols, p-tertiary octylphenoxy polyethyl alcohol and mixtures thereof and an anionic surfactant selected from the group consisting of alkyl ether phosphate, cetyltrimethylammonium bromide and mixtures thereof.

2. The smoothing layer of claim 1, wherein said high dielectric constant material is a piezoelectric or ferroelectric material.

3. The smoothing layer of claim 2, wherein said piezoelectric or ferroelectric material is lead zirconate titanate (PZT).

4. The smoothing layer of claim 2, wherein said piezoelectric or ferroelectric material smoothing layer comprises one or more of lead lanthanum zirconate titanate, barium titanate, barium strontium titanate, barium tantalate and tantalum oxide.

5. The smoothing layer of claim 1, wherein said surfactant is added to a metal organic solution.

6. The smoothing layer of claim 1, wherein said surfactant is provided as about 0.1% to about 5% by weight of said metal organic solution.

7. The smoothing layer of claim 6, wherein said surfactant is provided as about 1.0% to about 2% by weight of said metal organic solution.

8. The smoothing layer of claim 1, wherein said non-ionic surfactant is 2,4,7,9-tetramethyl-5-decyne-4,7-diol.

9. The smoothing layer of claim 1, wherein said smoothing layer is sintered at temperatures of up to about 850° C.

10. The smoothing layer of claim 1, wherein said smoothing layer is provided as two or more layers having a total thickness of up to about 1500 nm on said thick film dielectric layer.

11. A sintered composite thick film dielectric structure for an electroluminescent display, said structure comprising;
a thick film dielectric layer; and
a smoothing layer thereon, said smoothing layer comprising a high dielectric constant material with an areal density of pit defects of about less than 100 defects per square millimeter, made by the addition of a surfactant to a metal organic solution or a sol gel of organo metallic precursor compounds that is subsequently sintered on said thick film dielectric layer, wherein said surfactant is selected from the group consisting of a non-ionic surfactant selected from the group consisting of dimethyl hexynol, ethoxylated acetylenic diols, p-tertiary octylphenoxy polyethyl alcohol and mixtures thereof and an anionic surfactant selected from the group consisting of alkyl ether phosphate, cetyltrimethylammonium bromide and mixtures thereof.

12. The composite thick film dielectric structure of claim 11, wherein said high dielectric constant material is a piezoelectric or ferroelectric material.

13. The composite thick film dielectric structure of claim 12, wherein said piezoelectric or ferroelectric material is lead zirconate titanate (PZT).

14. The composite thick film dielectric structure of claim 12, wherein said smoothing layer is selected from the group consisting of lead lanthanum zirconate titanate, barium titanate, barium strontium titanate, barium tantalate and tantalum oxide.

15. The composite thick film dielectric structure of claim 11, wherein said surfactant is provided as about 0.1% to about 5% by weight of said metal organic solution.

16. The composite thick film dielectric structure of claim 15, wherein said surfactant is provided as about 1.0% to about 2% by weight of said metal organic solution.

17. The composite thick film dielectric structure of claim 11, wherein said non-ionic surfactant is 2,4,7,9-tetramethyl-5-decyne-4,7-diol.

18. The composite thick film dielectric structure of claim 11, wherein said smoothing layer is provided as two or more layers having a total thickness of up to about 1500 nm.

19. The composite thick film dielectric structure of claim 18, wherein said smoothing layer that is not directly adjacent said thick film dielectric layer, is made from a metal organic solution or a sol gel of organo metallic precursor compounds to which no surfactant is added.

20. The composite thick film dielectric structure of claim 11, wherein said thick film dielectric layer is formed from a composition sintered from a paste comprising:
(a) one or more of lead magnesium niobate (PMN), lead magnesium niobate-titanate (PMN-PT), lead titanate, barium titanate and lead oxide;
(b) glass frit composition comprising lead oxide, boron oxide and silicon oxide;
(c) solvent; and
(d) polymer binder.

21. The composite thick film dielectric structure of claim 20, wherein said sintering temperature is up to about 850° C.

22. An electroluminescent display, said display comprising;
a substrate;
a composite thick film dielectric structure as claimed in claim 11 provided on said substrate; and
a phosphor composition provided on said composite thick film dielectric structure.

23. The display of claim 22, wherein said composite thick film dielectric structure comprises a smoothing layer having an areal density of pit defects of about less than 100 defects per square millimeter.

24. A sintered composite thick film dielectric structure for an electroluminescent display, said structure comprising:
(a) a lower layer of a thick film dielectric composition comprising one or more of lead magnesium niobate (PMN), lead magnesium niobate-titanate (PMN-PT), lead titanate, barium titanate and lead oxide; a glass frit composition comprising lead oxide, boron oxide and silicon dioxide; and
(b) an upper smoothing layer comprising at least one layer of lead zirconate titanate (PZT), wherein said at least one layer directly adjacent to (a) has an areal density of pit defects of about less than 100 defects per square millimeter and is made by the addition of a surfactant to a metal organic solution or a sol gel of organo metallic precursor compounds that is subsequently sintered on said thick film dielectric layer, wherein said surfactant is selected from the group consisting of a non-ionic surfactant selected from the group consisting of dimethyl hexynol, ethoxylated acetylenic diols, p-tertiary octylphenoxy polyethyl alcohol and mixtures thereof and an anionic surfactant selected from the group consisting of alkyl ether phosphate, cetyltrimethylammonium bromide and mixtures thereof.

25. The structure of claim 24, wherein said non-ionic surfactant is 2,4,7,9-tetramethyl-5-decyne-4,7-diol.

* * * * *